United States Patent Office 2,713,067
Patented July 12, 1955

2,713,067

ADIPIC ACID RECOVERY PROCESS

Clement H. Hamblet and Robert E. Gee, Wilmington, Del., assignors to E. I. du Pont de Nemours and Company, Wilmington, Del., a corporation of Delaware No Drawing. Application September 3, 1952,
Serial No. 307,712

5 Claims. (Cl. 260—537)

This invention relates to the production of adipic acid and related aliphatic dibasic acids and more particularly to the separation of adipic acid from a reaction mixture containing that acid with monobasic and other dibasic acids.

Production of pure dibasic acids by oxidation of cycloparaffins is of considerable commercial interest because of the extensive use of such acids in the preparation of polyamide resins and the ready availability of cyclic hydrocarbons as starting materials from which the acids can be made. It has been shown by Hamblet et al. in U. S. Patent 2,557,282 that the direct oxidation of cyclanes leads to a variety of products including, inter alia, monobasic and dibasic acids. From the crude mixture of oxidation products separation of a desired acid in an acceptable state of purity is difficult and yields of any single acid quite low. These inventors have shown that yields of dibasic acids can be remarkably improved by carrying out the oxidation in stages; in one stage air oxidizing cycloparaffins and in another stage nitric acid oxidizing the product obtained from the air oxidation. The crude mixture of acids obtained in accord with the aforesaid two-stage process is in a concentrated nitric acid solution. One of the most important products of the reaction, adipic acid, is produced associated with other dibasic acids such as glutaric and succinic acid. The solubilities of these acids in nitric acid are such that it has not been possible heretofore to recover economically as much of the pure adipic acid as desired.

An object of the present invention is to provide a process for the separation of pure adipic acid from a solution of mono and dibasic acids in nitric acid. Yet another object is to provide a process for the crystallization of adipic acid from nitric acid solution thereof in high yields. A further object is to provide a process for the recovery of adipic acid from the mixture of mono and dibasic acids obtained from the two-step process of oxidizing cyclanes. A further object is to conduct the crystallization of adipic acid from the mixture of acids obtained by the air and nitric acid oxidation of cyclohexane in at least two stages, in the first of which crystallization is conducted in concentrated nitric acid and in the second in dilute nitric acid. Other objects and advantages of the invention will hereinafter appear.

In accord with the invention it has been found that a high recovery of pure adipic acid is possible from nitric acid solutions containing that acid with mono and dibasic acids by conducting the separation in two steps; in the first step the adipic acid is crystallized from a supersaturated solution thereof in concentrated nitric acid, leaving some adipic acid in solution, and in the second step the remaining adipic acid is subjected to crystallization from a more dilute nitric acid solution. While the process of the invention is primarily directed to the recovery of adipic acid from the crude reaction product obtained from the air and nitric acid oxidation of cycloparaffins, the process nevertheless is applicable to any mixture of mono- and/or dibasic acids in nitric acid solutions containing adipic acid.

Adipic acid for use as an intermediate in the preparation of polyamide resins must be pure. In an attempt to increase the recovery of adipic acid from mixtures of dibasic acids, including succinic acid, attempts have been made to minimize the loss of that acid in the purge stream from a crystallization process by decreasing the amount of purge, i. e., by increasing the proportions of the mother liquor recycled to the process. When operating in this manner a point is quickly reached where succinic acid crystallizes with adipic acid in the crystallizers and is carried into the refining systems. This is highly undesirable because contamination of the refined adipic acid by as little as 0.1% succinic acid influences the quality of the polymer made from this acid and hexamethylene-diamine for example. It is known that 0.1 mole per cent succinic acid decreases polymer relative viscosity by as much as 0.4 unit and increases amine ends by 1.3 moles/ $10^6$ g. Such changes in viscosity influence spinning while such changes in amine ends influence dye penetration.

Extensive research has revealed that in order to carry out the crystallization at sufficiently high rates as to be practical and economical in large scale operations, the first crystallization of adipic acid from concentrated nitric acid solutions containing monobasic and dibasic acids, including succinic acid, should preferably not be conducted at temperatures below about 40° C. Such high temperature crystallization leaves, however, an inordinate amount of adipic acid in the mother liquor contaminated with large amounts of monobasic and dibasic acids.

One feature of the invention is to recover a maximum amount of pure adipic acid from the crude concentrated nitric acid solution by crystallization. The mother liquor from this crystallization is treated to remove a portion of its nitric acid content and is then diluted with water; this makes it possible to recover from the dilute nitric acid solution, by crystallization, another crop of adipic acid crystals substantially succinic acid free. Without such dilution a smaller proportion of pure acid is recovered.

The following examples will illustrate preferred embodiments of the invention in which parts are by weight unless otherwise stated.

*Example 1.*—A mixture of monobasic and dibasic acids obtained in accord with U. S. Patent 2,557,282 and containing about 40% nitric acid based on volatiles (these mixtures may contain nitric acid ranging from 25–50% based on volatiles) was concentrated by removal of water and monobasic acids by distillation at 100–105° C. The concentrate was supersaturated with respect to adipic acid by cooling to a crystallization temperature of about 50° C. The nitric acid mother liquor was separated from the crystallized adipic acid and subjected to distillation until its volatile content had been reduced to about 30%. The thus treated mother liquor was diluted with water until the nitric acid content was reduced to about 10% and again supersaturated with respect to adipic acid by cooling to a crystallization temperature of 30° C. The recovery of adipic acid by this new method is 96% complete, whereas by the best previously known methods the maximum yield was 92%.

*Example 2.*—A mixture of adipic acid, by-product dibasic acid and monobasic acids, and nitric acid was made up to represent the crude reaction product obtained from the air and nitric acid oxidation of cycloparaffins. Half of this synthetic mixture was treated in the hitherto best-known practical method to recover the maximum amount of adipic acid; the other half of the mixture was treated by the new recovery process of the invention (as outlined in Example 1). Since succinic acid is the least soluble of the by-product impurities, it must be continuously purged from the process so that a direct comparison of the recovery efficiency can be made by comparing the ratio of adipic acid to succinic acid in the final purge mother liquors (waste). With the first half of the synthetic mixture treated in a conventional manner, the ratio of adipic acid to succinic acid in the waste purge was 1.00:1, while in the second portion treated by the recovery process of the invention the ratio was 0.46:1. In other words, every pound of succinic acid purged from the system, using the conventional method, would require a loss of one pound of valuable adipic acid; using the new recovery process results in the loss of only less than a half pound of adipic acid.

While the process of the examples illustrates the invention by way of batch or discontinuous recovery processes, the recovery of pure adipic acid can be conducted in a continuous manner wherein the mixture obtained by the air oxidation of cyclohexane for example, is continuously oxidized in nitric acid in accord with the process of the Hamblet et al. patent ibid. The product of the reaction is passed into a continuous still for removing excess water and monobasic acids and from this still the concentrated product is fed into a continuous crystallizer. The mother liquor from this crystallizer is then passed into an evaporator for lowering its volatiles content and is then diluted with water and transferred to a final continuous crystallizer for recovering the adipic acid content thereof.

In the process of the invention, whether conducted by a batch or continuous method, the first crystallization is conducted from a nitric acid solution having a concentration of from 30 to 60% nitric acid on a volatiles basis of the mixture of mono and dibasic acids in which adipic acid is present in excess by weight over the succinic acid. By this crystallization approximately 70 to 85% of the adipic acid present is recovered. The amount of nitric acid in the mother liquor is then lowered by distillation and evaporation to remove at least 75% of the nitric acid present and preferably about 85%. The resulting solution is then diluted with water until that acid has been reduced to a concentration of 15% or below. The resulting dilute nitric acid solution is then subjected to reduced temperature to supersaturate the solution with respect to adipic acid and that acid then separated by crystallization.

When the process is conducted continuously nitric acid recovered by distillation from the mother liquor is returned to the nitric acid oxidation step of the process and the second mother liquor, after separating the adipic acid crystals from it, is passed to a suitable evaporator for the recovery of its dilute nitric acid content which likewise is returned to the system. The residue from the latter step may be subjected to further treatment for the recovery of organic acid values contained therein or discarded.

We claim:
1. In a process for the recovery of adipic acid from a reaction mixture obtained by the air oxidation of a cyclo paraffin followed by nitric acid oxidation of the mixture obtained from the air oxidation, the steps which comprise crystallizing a portion of the adipic acid from the nitric acid oxidation reaction mixture, reducing the nitric acid concentration in the mother liquor from crystallization and then crystallizing adipic acid from the mother liquor of dilute nitric acid content.

2. In a process for the recovery of adipic acid from a reaction mixture containing it with succinic acid and having a nitric acid concentration of greater than 30% on a volatiles basis, the ratio of adipic to succinic acid being greater than 1, the steps which comprise crystallizing adipic acid from the nitric acid mixture of acids, reducing the concentration of nitric acid in the mother liquor from the adipic acid crystallization stage to less than 15% based on volatiles, and thereafter, in a second stage, crystallizing adipic acid from the mother liquor of nitric acid concentration lower than 15%.

3. In a process for the recovery of adipic acid from a crude reaction mixture containing that acid and succinic acid, together with nitric acid present to the extent of from 25 to 50% on a volatiles basis, the steps which comprise separating the adipic acid in at least two successive crystallization stages, in one of which the crystallization is conducted from a solution containing better than 30% nitric acid on a volatiles basis and in another of which crystallization is conducted in a solution containing less than 15% nitric acid on a volatiles bases.

4. In a continuous process for the crystallization of adipic acid from a crude reaction mixture obtained by hydrocarbon oxidations with air and nitric acid, the steps which comprise continuously crystallizing adipic acid from supersaturated solutions thereof containing better than 30% nitric acid on a volatiles basis, separating the mother liquor from the adipic acid crystals, evaporating nitric acid from the mother liquor and subsequently diluting with water to give a liquor containing less than 15% nitric acid based on volatiles and thereafter crystallizing adipic acid from that liquor.

5. In a process for the crystallization of adipic acid from a crude reaction mixture containing monobasic and dibasic acids obtained by the air oxidation of cyclohexane followed by its oxidation with concentrated nitric acid, the steps which comprise concentrating the crude reaction mixture by the removal of water and monobasic acid by distillation, cooling the resulting concentrate to supersaturation with respect to adipic acid to a temperature of about 50° C., separating the nitric acid mother liquor from the crystallized adipic acid, subjecting said mother liquor to distillation until its volatile content has been reduced to about 30%, diluting the thus treated mother liquor with water to reduce its nitric acid content to about 10%, thereafter supersaturating that solution with respect to adipic acid by cooling to a temperature of 30° C. and thereafter crystallizing adipic acid from the supersaturated solution.

References Cited in the file of this patent
UNITED STATES PATENTS

| | | |
|---|---|---|
| 2,285,601 | McAllister | June 9, 1942 |
| 2,343,534 | Cavanaugh et al. | Mar. 7, 1944 |
| 2,557,282 | Hamblet et al. | June 19, 1951 |